United States Patent [19]
Schlaegel

[11] Patent Number: 6,073,384
[45] Date of Patent: Jun. 13, 2000

[54] FISHING LURE AND BAIT HARNESS

[76] Inventor: Gene A. Schlaegel, 1810 Winston Dr., Iowa City, Iowa 52242

[21] Appl. No.: 09/072,750

[22] Filed: May 4, 1998

[51] Int. Cl.[7] .................................................. A01K 85/00
[52] U.S. Cl. ........................ 43/42.5; 43/42.08; 43/44.2; D22/129
[58] Field of Search ................ 43/42.5, 42.51, 43/44.2, 44.8, 42.15, 42.08, 42.06; D22/129

[56] References Cited

U.S. PATENT DOCUMENTS

| | | | |
|---|---|---|---|
| D. 191,614 | 10/1961 | Elrod | D22/129 |
| 2,575,609 | 11/1951 | Alderman | 43/42.22 |
| 2,833,077 | 5/1958 | Benoit | 43/42.06 |
| 2,977,710 | 4/1961 | Stambaugh | 43/44.2 |
| 3,137,085 | 6/1964 | Swenson | 43/42.36 |
| 3,260,012 | 7/1966 | Stolzer | 43/42.1 |
| 3,403,469 | 10/1968 | Whitney | 43/42.06 |
| 4,129,957 | 12/1978 | Thirlby | 43/44.2 |
| 4,471,557 | 9/1984 | Gage | 43/42.5 |
| 5,379,543 | 1/1995 | Avent | 43/42.15 |

*Primary Examiner*—Kurt Rowan
*Attorney, Agent, or Firm*—G. Brian Pingel

[57] ABSTRACT

A lure and bait harness for securing bait to a lure or hook which allows for quick and efficient attachment. The lure and bait harness comprise a retainer secured to an overcenter spring. The spring includes a first arm and second arm which are secured to one another in a manner which allows the spring to be biased in an open position away from the retainer which allows for placement of the bait in the harness and biased in a closed position retaining a piece of bait between the retainer and the spring. By providing the retainer or spring with a spur the bait is securely held against unintentional dislodgment. Where desire the lure and bait harness is provided with a first fin and a second fin pitched in a similar manner to provide the lure or harness with rotation as the lure or harness is pulled through the water.

16 Claims, 4 Drawing Sheets

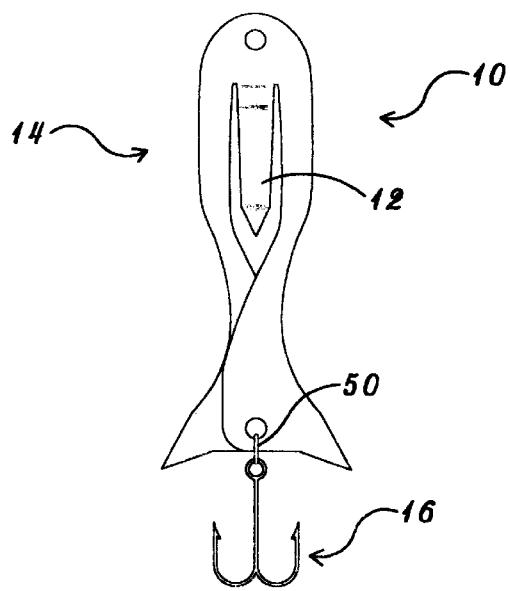
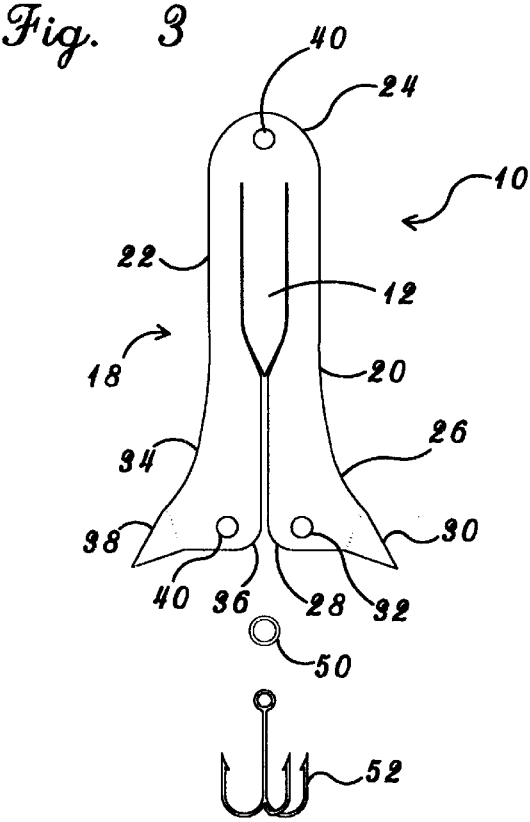
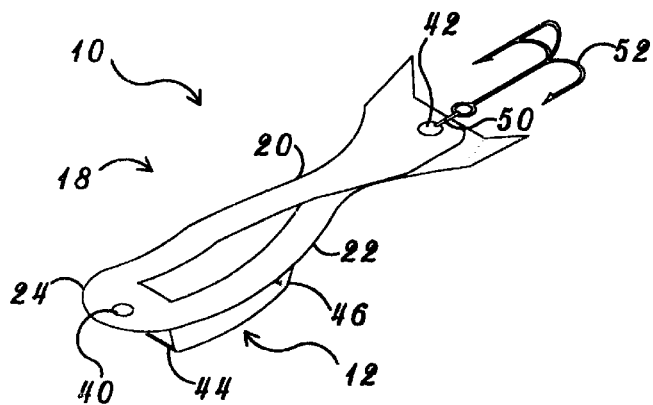

FISHING LURE AND BAIT HARNESS

BACKGROUND OF THE INVENTION

1. Field of the Invention

The present invention relates in general to a fishing lure and bait harness, and more specifically to a lure and bait harness designed for speedy attachment of artificial or natural bait.

2. Description of the Prior Art

It is known in the art to provide fishing lures with hooks or other types of securement apparatus for securing natural or artificial bait to the lure. One drawback associated with such securement devices is that they do not have a spring device that snaps open and snaps shut to quickly and effectively secure the bait to the lure or hook. An additional drawback is that they take more time and effort to attach the bait because there is no spring device to snap open and then snap shut to secure the bait in a fishing position.

SUMMARY OF THE INVENTION

The present invention provides a fishing lure with harness for quickly and effectively securing bait for casting, trolling, jigging, or still fishing. The harness which may also serve as a lure includes a retainer and an over center spring device. The spring device includes two resilient arms secured relative to the retainer. The spring device also includes a shoulder connecting the arms. The arms are secured to one another in a manner which allows the arms to be either snapped toward the retainer in a closed orientation or snapped away from the retainer in an open orientation.

Preferably, a spur is secured to either the retainer or the spring for releasably securing artificial or natural bait to the harness and/or lure.

When the artificial or natural bait will extend beyond the bend in the hook, the bait is laid along side of the lure or harness to measure where the hook should be inserted into the tail of the bait. The hook is then inserted through the tail of the bait, and then the head of the bait is swung under the retainer and the spring snapped shut, thereby holding the bait in place by both the retainer and the hook.

BRIEF DESCRIPTION OF THE DRAWINGS

FIG. 1 is a bottom elevation of a first embodiment of the bait harness and lure of the present invention;

FIG. 2 is a perspective view of the embodiment of FIG. 1;

FIG. 3 is a bottom elevation of a metal body including a retainer, a ring and a hook, all before being formed into the embodiment of FIG. 1;

DETAILED DESCRIPTION OF THE PREFERRED EMBODIMENT

Figure 4A:
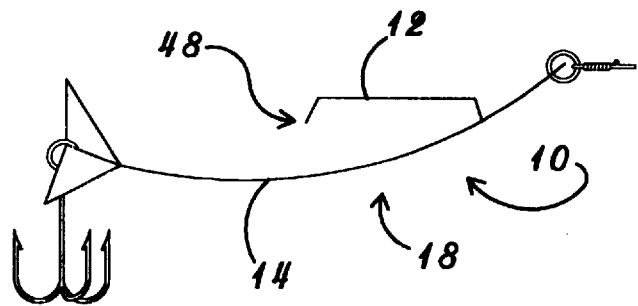
FIG. 4(a) is a side elevation of the embodiment of FIG. 1 showing the retainer in the closed orientation.

With referenced to the drawings, a fishing lure and bait harness apparatus is indicated generally as 10 in FIG. 1. The apparatus 10 includes a retainer 12, an overcenter spring apparatus 14, and a hook assembly 16.

As shown in FIG. 3, the apparatus 10 in its unformed condition, includes a body 18, constructed of a single piece of spring steel. Although spring steel is used in the preferred embodiment, the body 18 may be constructed of plastic or any suitably resilient material. The body 18 includes a first arm 20, a second arm 22, and a shoulder 24 connecting the two arms 20 and 22. The body also includes the retainer 12 which is secured to the shoulder 24 and is shown in a straight condition which it is in before being formed.

As shown in FIG. 3, the first arm 20 is provided with a foot 26, having a heel 28, and a toe 30. The heel 28 is provided with a hole 32, and the toe 30 is bent upward for a purpose to be described below. Similarly, the second arm 22 is provided with a foot 34 having a heel 36 and a toe 38. The heel 36 is provided with a hole 40 and the toe 38 is bent downward. The shoulder 24 is provided with an eyelet 40.

As shown in FIG. 2, the body 18 is bent to form the apparatus 10 of the present invention. To accomplish this, the hole 32 (FIG. 3 only) of the first foot 26 is positioned over the hole 40 (FIG. 3 only) of the second foot 34 and an eyelet rivet 42 is used to secure the first foot 26 to the second foot 34. By positioning the first hole 32 over the second hole 40, the body 18 is bent into an arcuate shape as shown in FIG. 4(a) to provide an overcenter spring action.

Once the first hole 32 has been riveted to the second hole 40, the retainer 12 is bent to provide a first bend 44 and a second bend 46. As shown in FIG. 4(a), a retainer 12 is provided with a spur 48 directed toward the overcenter spring apparatus 14. As shown in FIG. 2, the hook assembly 16 includes a steel retainer ring 50 and a treble hook 52. The retainer ring 50 is secured to the eyelet rivet 42 to secure the treble hook 52 to the body 18.

Figure 4B:
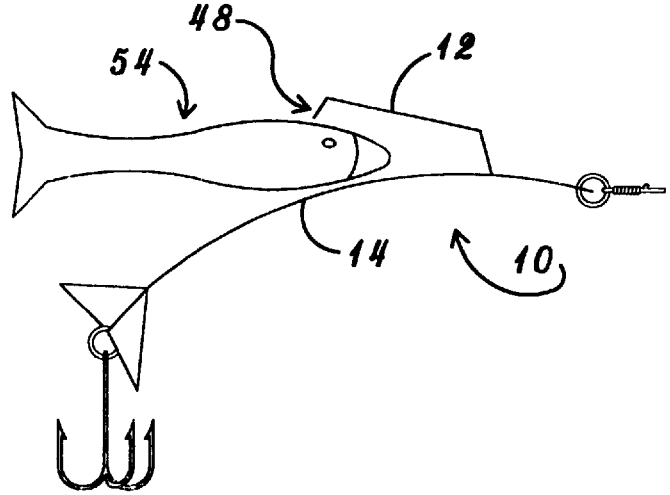
FIG. 4(b) is a side elevation of the embodiment of FIG. 1 shown in the open orientation with an artificial or natural bait provided between the spring and the retainer.
Figure 4C:
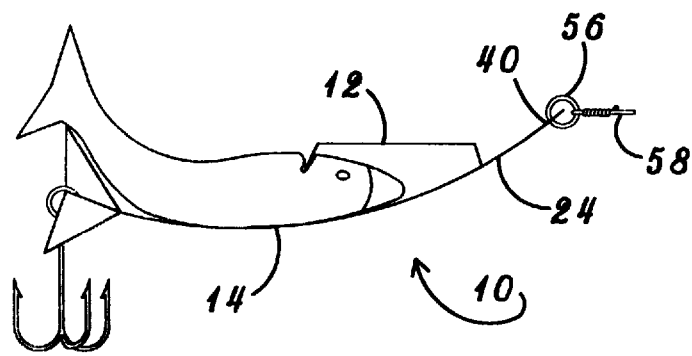
FIG. 4(c) is a side elevation of the embodiment of FIG. 1 with the lure or harness in the closed orientation securing the bait between the retainer and spring.

To use the apparatus 10 of the present invention, the apparatus 10 is positioned as shown in FIG. 4(a) and the spring apparatus 14 is bent by a user (not shown) in a direction opposite the natural curve shown in FIG. 4(a). As the spring apparatus 14 is bent, the spring apparatus 14 naturally snaps itself in the reverse curvature shown in FIG. 4(b). Once the spring apparatus 14 is snapped into this open orientation, an artificial, or natural bait 54 is positioned between the spur 48 and the spring apparatus 14. While the bait 54 may be any desired bait known in the art, in the preferred embodiment, the bait 54 is a minnow, or a plastic bait. Once the bait 54 is positioned as shown in FIG. 4(b), the spring apparatus 14 is bent toward its closed orientation to snap shut, thereby securing the bait 54 between the spur 48 and the spring apparatus as shown in FIG. 4(c).

When it is desired to use the apparatus 10, a steel retainer ring 56 is secured through the eyelet 40 of the shoulder 24 to allow securement of fishing line 58 to the apparatus 10. To use the apparatus 10, the entire apparatus 10 is cast into the water and pulled toward the user by the fishing line 58. The curvature of the toes 30 and 38 described above create "fins" which cause the apparatus 10 to spin in the water as it is pulled. This spinning action makes the entire apparatus 10 more noticeable to fish, and, therefore, more attractive as a lure.

Figure 5:
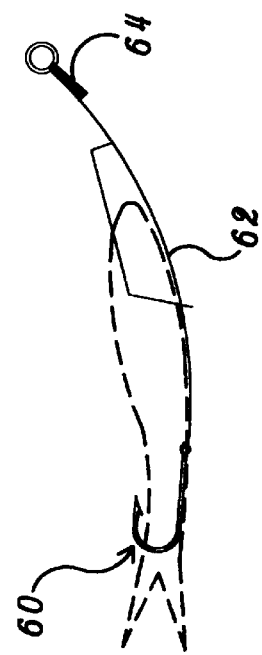
FIG. 5 is a side elevation of a second embodiment of the present invention showing a single hook and a lead weight secured to a harness and lure and with an artificial or natural bait.

Shown in FIG. 5 is an alternative embodiment of the invention wherein a single hook 60 is riveted to a spring apparatus 62 similar to the spring apparatus described above. Additionally, a lead weight 64 is secured to the spring apparatus 62 to allow for fishing at greater depths.

Figure 7:
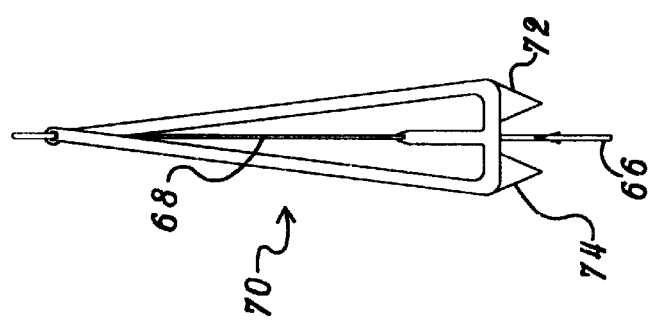
FIG. 7 is a top elevation of the embodiment of FIG. 6.
Figure 6:
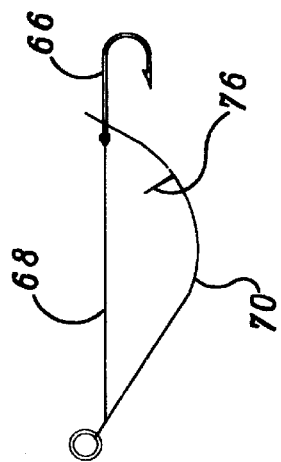
FIG. 6 is a side view of a third embodiment of a bait harness of the present invention showing a single hook secured to the retainer.

Another alternative embodiment is shown in FIGS. 6–7. In this embodiment, a single hook 66 is secured to a retainer 68 which is in the shape of a metal shaft. As shown in FIG. 7, the spring apparatus 70 of this embodiment is provided with two outward spurs 72 and 74 extending upward on either side of the hook 66. The spring apparatus 70 is also provided with an inward spur 76 extending toward the retainer 68 at approximately a 90 degree angle from the other spurs 72 and 74.

Figure 8:
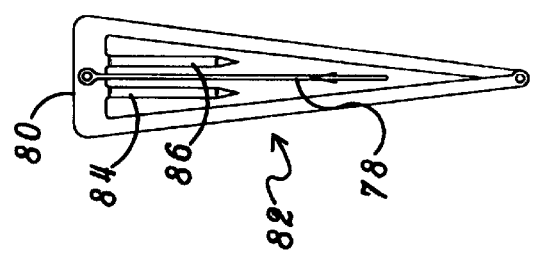
FIG. 8 is a fourth embodiment of a bait harness of the present invention showing the hook secured to the shoulder of the spring.
Figure 9:
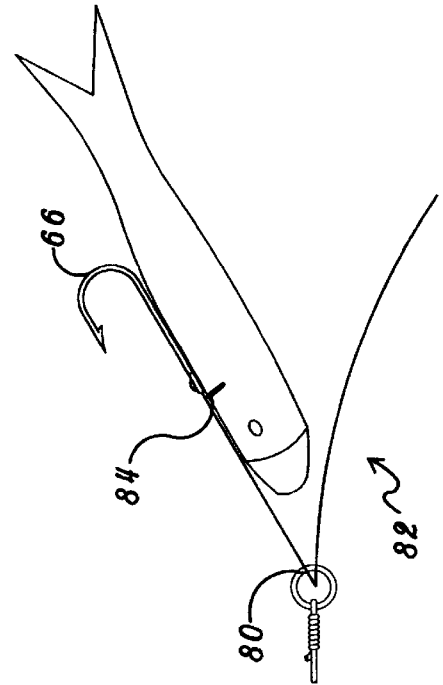
FIG. 9 a side view of the embodiment of FIG. 8 together with an artificial or natural bait and showing the spring in a snapped open position.
Figure 10:
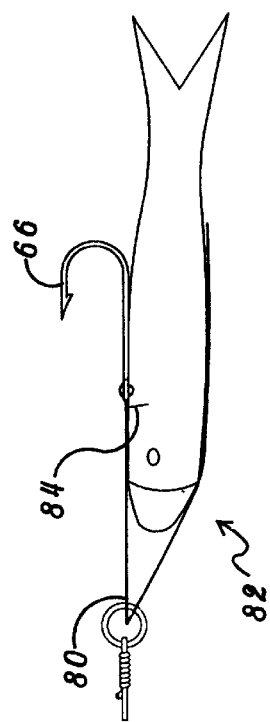
FIG. 10 is a view similar to that of FIG. 9, but showing the spring in a snapped closed condition.

Shown in FIG. 8 is yet another alternative embodiment of the present invention wherein a single hook 78 is secured to the shoulder of the spring apparatus 82. Two spurs 84 and 86 are secured to the shoulder and directed toward the hook 78. FIGS. 9 and 10 show the embodiment of FIG. 8 with a minnow or plastic bait and in open and closed conditions respectively.

Figure 11:
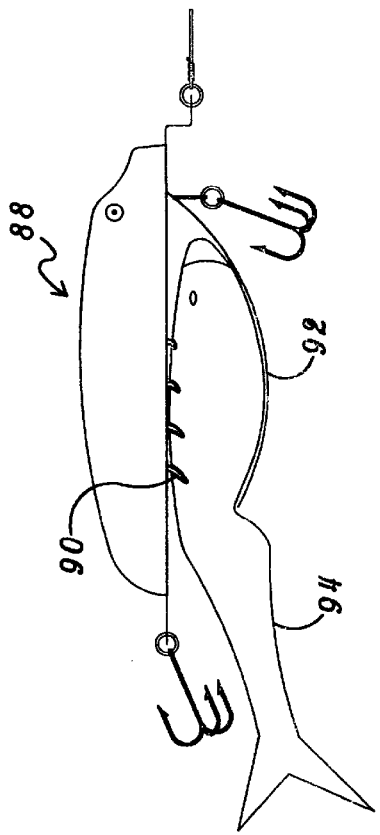
FIG. 11 is a side elevation showing a fifth embodiment of the present invention provided on a plug with a plurality of spurs maintaining an artificial lure between the spring and plug.

FIG. 11 shows yet another alternative embodiment of the present invention wherein a "plug" type lure 88 is provided on its underside with a plurality of spurs 90. Secured through the lure 88 is a dual-armed spring apparatus 92 such as that described above. To operate this alternative embodiment of the present invention, the spring apparatus 92 is bent away from the closed orientation show in FIG. 9 to a snapped open orientation. A minnow, baitfish, worm, leech or artificial bait 94 may thereafter be positioned between the spring apparatus 92 and the spur 90. The spring apparatus 92 is then bent toward its closed orientation, snapped shut as described above, thereby retaining the bait 94 between the spring apparatus 92 and the spurs 90.

Although the invention has been described with respect to a preferred embodiment thereof, it is to be understood that it is not to be so limited, since changes in modifications can be made therein which are in the full and intended scope of this invention as defined by the appended claims. For example, it is anticipated that a typical women's hair barrette may be substituted for the body 18 described above. It is additionally anticipated that the retainer may be a spoon or jig such as those known in the art.

In all of the applications, the metal spring, such as used in a barrette, is snapped open, the bait inserted, and then the spring is snapped shut, firmly holding the bait in position desired for fishing. When the bait is longer than the lure or harness, the tail of the bait is first skewered onto the hook with the spring in the open position, and then the head of the bait is swung under the prong and the spring snapped shut with the bait secured by the spring and the prong, the device will catch the fish that "strike short." When the bait is secured by the hook alone, fish that strike short steal the bait and do not get hooked.

What is claimed is:

1. A lure and bait harness for securing fishing bait for casting, trolling, jigging or still fishing, said harness comprising:

(a) an elongate retainer having a point at one end;

(b) an overcenter spring on which said retainer is generally medially located comprising:

(i) a first arm of resilient spring material secured in a generally parallel relationship to said retainer and having first and second opposite ends that extend beyond said retainer;

(ii) a second arm of resilient spring material secured in a generally parallel relationship to said retainer and having first and second opposite ends that extend beyond said retainer;

(iii) a shoulder connecting said first end of said first arm to said retainer and to said first end of said second arm; and (iv) said second ends of said first arm and said second arm secured to each other to place a bias tension on said spring such that said arms form an arc relative to said retainer, which arc is snapped toward said retainer in a closed orientation of said retainer relative to said arms for retaining said fishing bait and alternatively snapped away from said retainer in an open orientation of said retainer relative to said arms.

2. The lure and bait harness of claim 1, wherein said retainer is a spur.

3. The lure and bait harness of claim 1, wherein said retainer is a plurality of spurs.

4. The lure and bait harness of claim 1, wherein said first arm, said second arm, said shoulder and said retainer are formed from a single piece of material.

5. The lure and bait harness of claim 1, further comprising a hook secured to said retainer.

6. The lure and bait harness of claim 1, further comprising a piece of artificial bait biased against said retainer by said spring.

7. The lure and bait harness of claim 1, further comprising means secured to said spring for rotating said harness as said harness is pulled through the water.

8. The lure and bait harness of claim 7, wherein said rotating means is a first fin and a second fin secured to said spring.

9. The lure and bait harness of claim 8, wherein said first fin and said second fin are pitched in a substantially similar direction relative to said spring.

10. The lure and bait harness of claim 1, further comprising a plug secured to said retainer.

11. The lure and bait harness of claim 1, further comprising a spoon secured to said retainer.

12. The lure and bait harness of claim 1, further comprising a jig secured to said retainer.

13. The lure and bait harness of claim 1, wherein said first arm is provided with a first hole, wherein said second arm is provided with a second hole and wherein said first hole is secured in alignment with said second hole.

14. The lure and bait harness of claim 13, further comprising a hook secured to said spring through said first hole and said second hole.

15. The lure and bait harness of claim 1, wherein said shoulder is provided with a hole.

16. The lure and bait harness of claim 1, further comprising a hook secured to said shoulder.

* * * * *